J. F. EVINS.
NUT LOCK.
APPLICATION FILED AUG. 9, 1915.

1,170,144.                          Patented Feb. 1, 1916.

Witnesses
D. S. Yager
J. Shelton

Inventor
James F. Evins,
By G. W. Earnshaw
Attorney

UNITED STATES PATENT OFFICE.

JAMES F. EVINS, OF JOPLIN, MISSOURI, ASSIGNOR OF ONE-HALF TO CHARLES L. SMYER, OF SPRINGDALE, ARKANSAS.

NUT-LOCK.

1,170,144.  Specification of Letters Patent.  Patented Feb. 1, 1916.

Application filed August 9, 1915. Serial No. 44,542.

*To all whom it may concern:*

Be it known that I, JAMES F. EVINS, a citizen of the United States, residing at Joplin, in the county of Jasper and State of Missouri, have invented certain new and useful Improvements in Nut-Locks, of which the following is a specification.

My invention relates to improvements in means for holding the nuts, carried by bolts of a railway joint, against loosening.

An important object of the invention is to provide means of the above mentioned character, which are simple in construction, inexpensive to manufacture, and convenient in use.

Other objects and advantages of the invention will be apparent during the course of the following description.

Figure 1:
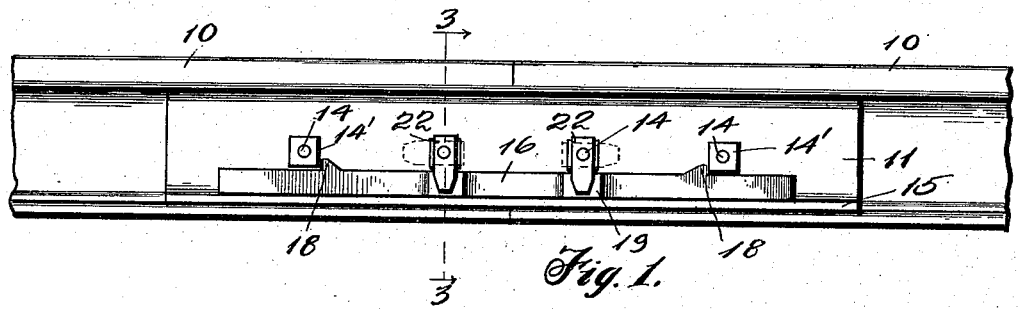
Figure 2:
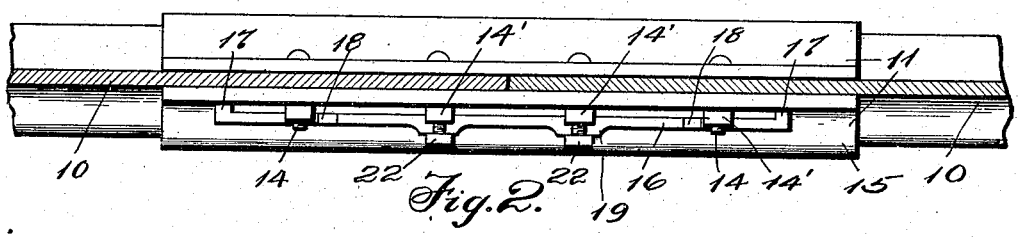
Figures 3, 4:
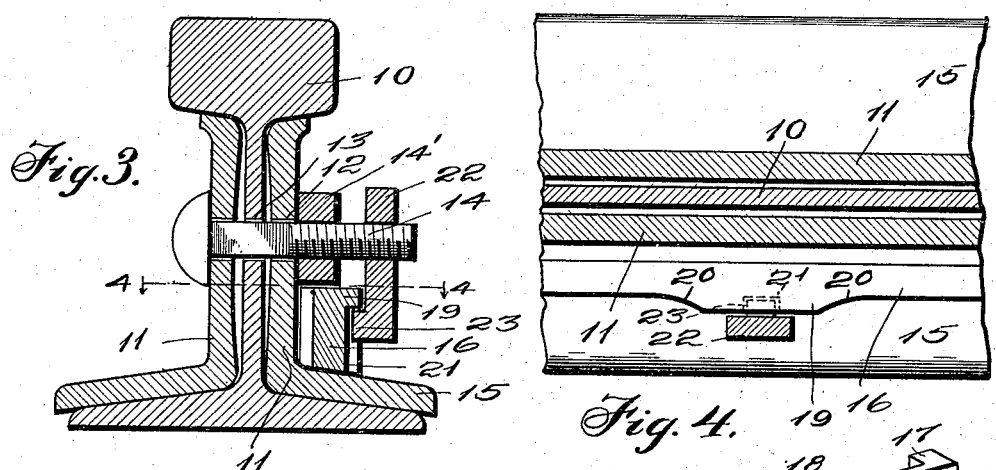
Figure 5:
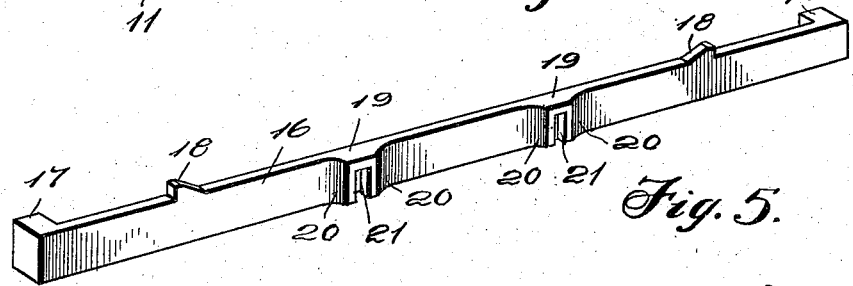

In the accompanying drawings forming a part of this specification and in which like numerals are employed to designate like parts throughout the same, Figure 1 is a side elevation of apparatus embodying the invention, Fig. 2 is a plan view of the same, with the rails in horizontal section, Fig. 3 is an enlarged transverse sectional view taken on line 3—3 of Fig. 1, Fig. 4 is an enlarged horizontal sectional view taken on line 4—4 of Fig. 3, and, Fig. 5 is a perspective view of a resilient nut holding bar.

In the drawings, wherein for the purpose of illustration is shown a preferred embodiment of my invention, the numeral 10 designates rails of the ordinary construction. Arranged upon opposite sides of the meeting ends of these rails are fish-plates 11, having apertures 12, adapted for registration with apertures 13 in the rails and receiving bolts 14. The openings 12 and 13 are preferably formed square in cross section for receiving square portions of the bolts thus holding them against rotation. These bolts 14 carry nuts 14′, as shown.

Adapted to be placed in contact with the base 15 of one fish-plate, is a nut holding bar 16, which is resilient or flexible and is provided at its ends with laterally extending horizontal feet or projections 17, to contact with the vertical portion of the fish-plate, for retaining the bar 16 normally spaced from such vertical portion, as clearly shown in Fig. 2. The nuts 14′ of the bolts 14 contact with the upper longitudinal edge of the resilient bar 16 and are held thereby against rotation. The longitudinal movement of the bar 16 with respect to the fish-plate is prevented by upwardly extending lugs 18, arranged inwardly of and adjacent the outer nuts 14′. The bar 16 is provided adjacent the nuts 14′ with enlargements or outwardly bulging portions 19, having inclined or cam faces or sides 20. These enlargements 19 are provided with recesses or notches 21, as shown.

The numeral 22 designates key-nuts, having screw-threaded openings to receive the ends of the bolts 14. At their lower ends these key-nuts are provided with laterally extending projections or teeth 23, to contact with the cam sides 20 and enter the openings or notches 21. The function of these key-nuts is to prevent the lateral displacement of the nut holding bar 16 and create a tension on the central bolts 14 preventing them from jarring loose in the apertures 11 and 12.

In the use of the apparatus, the key-nuts 22 are swung upwardly to bring their long ends out of the path of travel of the bar 16, such key-nuts being preferably moved to the horizontal position as indicated by the dotted lines in Fig. 1. The bar 16 is then placed in position, with its extensions 17 contacting with the vertical portion of the fish-plate and its lugs 18 arranged inwardly of and adjacent the outer nuts 14′. The key-nuts 22 are then swung downwardly, whereby their teeth 23 slidably contact with the cam faces or sides 20, forcing the flexible or resilient bar 16 inwardly, until the teeth 23 enter the openings or notches 21, subsequent to which the bar moves outwardly for holding these key-nuts against turning movement. It is thus apparent that the bar 16 is held against longitudinal or lateral displacement, and this bar in turn positively holds all of the nuts against rotation. When it is desired to remove the bar 16 the key-nuts 22 are swung to a horizontal position, whereby the bar 16 may be moved laterally away from the fish-plate. When the bar 16 is removed the nuts 14′ may be turned in the usual manner for unscrewing them.

It is to be understood that the form of my invention, herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. The combination with a fish-plate and nut carrying bolts passing therethrough, of a substantially straight flexible bar provided near its ends with lateral extensions to contact with the fish-plate and adapted to be arranged beneath and adjacent the nuts to prevent their rotation, means to prevent the longitudinal movement of the bar with respect to the fish-plate, elements having screw-threaded engagement with the bolts, and co-acting elements carried by the bar to have detachable locking engagement with the first named elements to hold the bar against lateral movement.

2. Apparatus adapted for use in connection with a fish-plate and nut carrying bolts passing therethrough, comprising a substantially straight resilient bar provided with means adapted to contact with the fish-plate and normally hold the bar spaced therefrom, elements carried by the bar to contact with certain of the nuts for holding the bar against longitudinal movement with relation thereto, key-nuts having screw-threaded engagement with the bolts, and elements carried by the bar and adapted to have detachable locking engagement with the key-nuts.

3. Apparatus adapted for use in connection with a fish-plate and nut carrying bolts passing therethrough, comprising a resilient bar provided with spacing elements and adapted to be arranged near the fish-plate upon one side of the nuts to prevent rotation thereof, outwardly projecting members formed upon the bar and provided with exterior notches, key-nuts having screw-threaded engagement with the bolts and provided with teeth adapted to enter the notches in the outwardly projecting members, and means to prevent the longitudinal movement of the bar with relation to the fish-plate.

In testimony whereof I affix my signature in presence of two witnesses.

JAMES F. EVINS.

Witnesses:
S. S. YAGER,
JAS. R. SHELTON.

Copies of this patent may be obtained for five cents each, by addressing the "Commissioner of Patents Washington, D. C."